United States Patent [19]
Armstrong

[11] 3,810,215
[45] May 7, 1974

[54] PERCUSSIVE FLASH EXTENDER

[76] Inventor: Donald E. Armstrong, c/o GTE Sylvania Incorporated, 1050 E. Broad St., Montoursville, Pa.

[22] Filed: June 18, 1973

[21] Appl. No.: 370,974

[52] U.S. Cl. .................... 354/148, 240/1.3, 431/95
[51] Int. Cl. .......................................... G03b 19/02
[58] Field of Search ............ 95/11 L, 11 R, 11.5 R; 240/1.3, 2 C; 431/92, 93, 95 R

[56] References Cited
UNITED STATES PATENTS

| | | | |
|---|---|---|---|
| 3,706,265 | 12/1972 | Simon et al. | 95/11 L |
| 3,624,727 | 11/1971 | Horton et al. | 95/11.5 R |
| 3,590,706 | 7/1971 | Millet | 95/11.5 R |
| 3,348,188 | 10/1967 | Wood | 240/1.3 X |

Primary Examiner—Samuel S. Matthews
Assistant Examiner—Kenneth C. Hutchison
Attorney, Agent, or Firm—Edward J. Coleman

[57] ABSTRACT

A flash extender assembly for operatively attaching a percussive flashcube to a camera with the flash source sufficiently offset from the camera lens to reduce "red-eye" effect. The extender is a three-piece assembly comprising a retaining base identical to the flashcube base and insertable into a camera socket, a flashcube cover affixed to the retaining base and having its top wall adapted for receiving and detachably retaining the base of an inserted flashcube, and a plurality of rods extending from the retaining base toward the top wall of the cover and interconnected at one end by a flexible web attached to the retaining base. The retaining base has an aperture adjacent each rod through which the respective rod is accessible to be actuated by a flash actuating member in the camera, and each of the rods is aligned with a slot in the top wall of the cover and adapted to move therethrough upon actuation for firing a flashlamp in an inserted flashcube.

13 Claims, 7 Drawing Figures

PATENTED MAY 7 1974 3,810,215

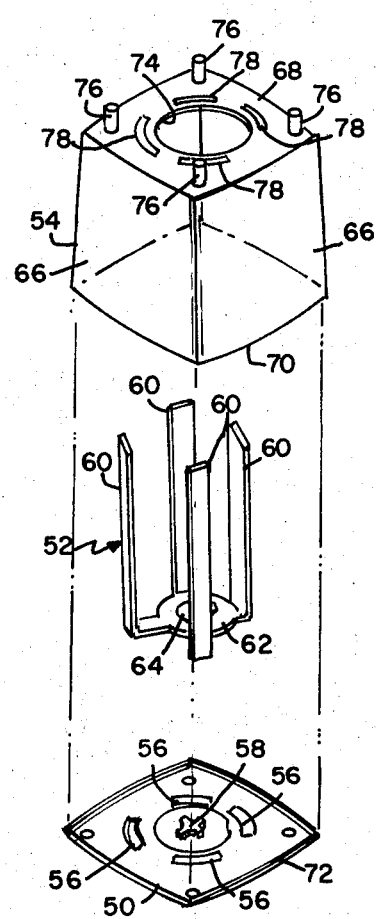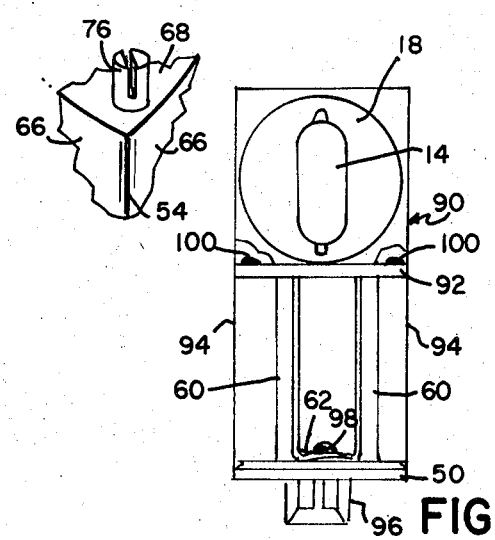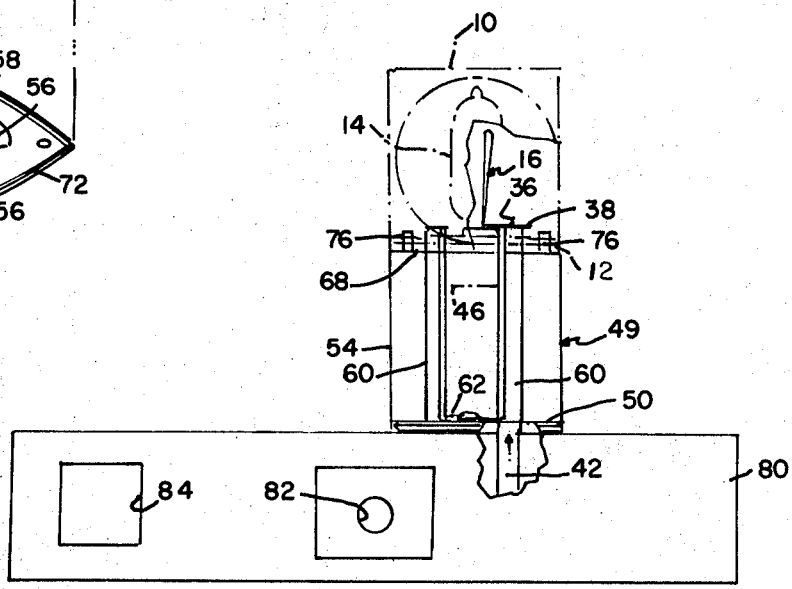

3,810,215

PERCUSSIVE FLASH EXTENDER

BACKGROUND OF THE INVENTION

This invention relates to flash photography, and more particularly, to means for extending a percussive multilamp flash unit at a predetermined distance away from a camera to which it is attached.

The trend in photoflash devices has been toward the use of subminiature flashlamps in compact, disposable, multilamp units to provide camera users with the advantages of greater convenience, compactness and portability. A currently popular flash unit of this type is known generally in the trade as a flashcube. The unit comprises a set of four flashlamps, each with own reflector, mounted on a base and enclosed within a transparent cover, with each of the lamp-reflector assemblies facing a respective one of the four side walls of the cube. A spindle depends from the center of the flashcube base for operatively retaining the unit in a complementary receiving socket on a camera. In operation the flashcube is sequentially rotated a quarter of a turn at a time, usually in response to each operation of a film advance mechanism of the camera, to successively place unused lamps in a firing position facing the object being photographed. Each of the flashlamps consists of an hermetically sealed, light transmitting glass envelope containing a filamentary combustible material, such as shredded zirconium foil, and a combustion supporting gas, such as oxygen. In the case of flashcubes employing electrically ignited lamps, such as the flashcube described in U.S. Pat. No. 3,327,105, a pair of lead-in wires pass through the lamp envelope to support therein a filament in combination with groubles of ignition paste. When the flashcube is in the firing position, segments of the lead-in wires disposed outside the lamp envelope are securely engaged with electrical contacts in the camera socket, which in turn are connected by wires and a shutter actuated switch to the camera power source, usually a pair of dry cell batteries. When a photographer actuates the shutter release mechanism to "snap" a picture, he also by the same operation, closes the electrical circuit from the batteries to the ignition system in the lamp to thereby flash the lamp. The timing of the ignition of the combustible material in the lamp is synchronized with the exposure of the film by actuation of the shutter release so that efficient utilization of light from the flashlamp may be obtained.

In the case of flashcubes employing percussively ignited lamps, such as the lamp described in U.S. Pat. No. 3,535,063, a mechanical primer is sealed in one end of the lamp in lieu of lead-in wires. This primer may comprise a metal tube extending from the lamp envelope and a charge of fulminating material on a wire supported in the tube. Operation of the percussive flashlamp is initiated by an impact onto the tube to cause deflagration of the fulminating material up through the tube to ignite the combustible disposed in the lamp envelope. Accordingly, the percussive flashcube further includes a plurality of preenergized striker springs each associated with a respective one of the lamps in the cube, as described in U.S. Pat. No. 3,597,604. The percussive flashcube is indexed into firing position similarly to the electrical flashcube; however, the flashlamp to be used is fired by the action of a member, associated with the camera shutter mechanism, moving up through the flashcube base to release the respective preenergized striker spring, whereby it sharply impacts against the primer tube of the lamp.

In view of the current trend toward smaller sized cameras, however, photographic problems may arise due to a substantial reduction in the lamp-to-lens distance. In the case of color film, the use of a flashlamp too near the lens when photographing human subjects may create an undesirable condition known as "red-eye," in which red light from a flashlamp is reflected by the retinas of the subjects' eyes unto the photographic film to shown the pupils as red on the developed color print. The only practical method of elminating "red-eye" is to provide adequate separation between the camera lens and the flashlamp. One approach toward correcting this problem on small cameras employing electrical flashcubes is described in U.S. Pat. No. 3,348,188, wherein a "flash extender" attachment is provided for supporting the electrical flashcube at an increased distance from the associated camera. The more remote flash location thereby provided is also advantageous for black and white photography in that it can be used to produce limited shadows for highlight and depth effect purposes without excess contrast.

SUMMARY OF THE INVENTION

Accordingly, it is an object of the present invention to provide a simple and inexpensive flash extender for percussive flashcubes.

A particular object of the invention is to provide a reusable or integral flash extender for a percussive flashcube which is of relatively simple design and constructed from inexpensive thermoplastic type materials.

These and other objects, advantages and features are attained, in accordance with the principles of this invention, by a flash extender comprising a retaining base insertable into a camera socket, mounting means supported on and spaced a predetermined distance away from the retaining base for receiving and detachably retaining the connecting base of an inserted flash unit, and a plurality of rods extending from the retaining base toward the mounting means and interconnected at one end by a flexible web attached to the retaining base. The flash unit with which the extender is to be used includes a plurality of percussively-ignitable flashlamps and associated preenergized strikers mounted on a connecting base provided with an aperture adjacent each striker through which the respective striker is accessible to be released for firing its respective flashlamp. The retaining base of the extender has an aperture adjacent each rod through which the respective rod is accessible to be actuated by a camera actuating member. The mounting means on the extender has a plurality of apertures in the connecting base of an inserted flash unit, and each of the rods in said extender is aligned with one of the apertures in mounting means and adapted to move therethrough upon actuation for releasing the striker.

BRIEF DESCRIPTION OF THE DRAWINGS

This invention will be more fully described hereinafter in conjunction with the accompanying drawings, in which:

FIG. 4 is an exploded view showing the three components of the flash extender of FIG. 3;

FIG. 4A is a fragmentary detail view of a portion of the cover in FIG. 4 showing a split pin projecting therefrom;

FIG. 5 is a front elevational view of a camera having a flash extender according to the invention mounted thereon, with the percussive flashcube attached to the extender being shown in phantom and with portions broken away for clarity; and FIG. 6 is an elevational view of an alternative embodiment of the invention comprising a multilamp flash unit in which the extender is an integral part thereof, portions being broken away for clarity.

DESCRIPTION OF PREFERRED EMBODIMENT

Figure 1:
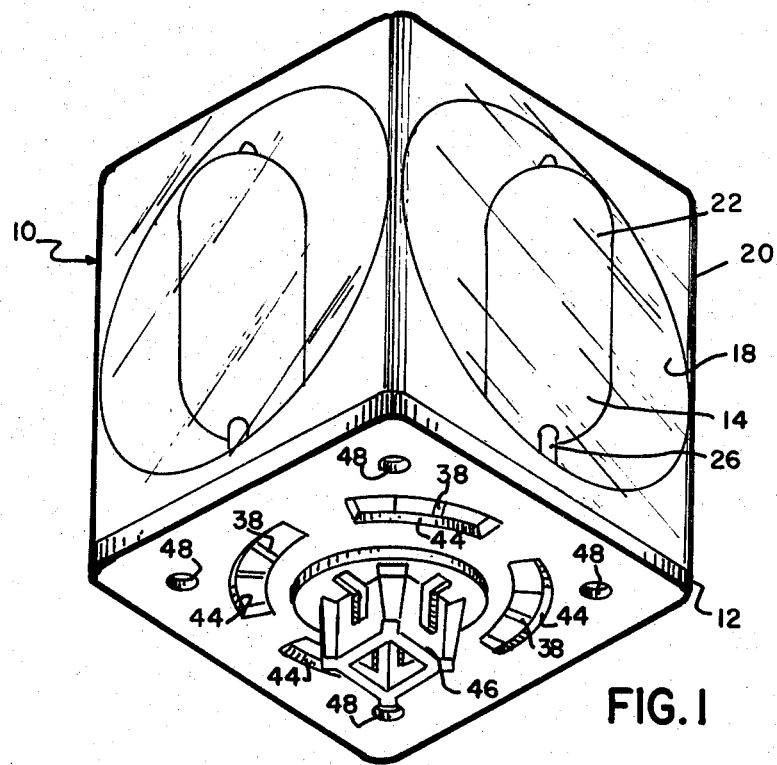
FIG. 1 is an enlarged perspective view of a percussive type multilamp flash unit, or flashcube, of the prior art with which an extender according to the invention may be used.
Figure 2:
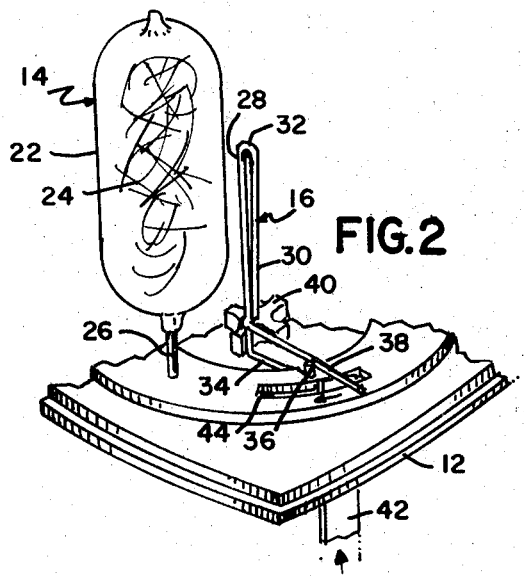
FIG. 2 is a fragmentary view of a single lamp-firing spring assembly of the flashcube of FIG. 1.

The flash extender of the present invention is intended for use in combination with a percussive type multilamp unit, or flashcube 10, such as that illustrated in FIGS. 1 and 2, together with a camera having a rotatable socket for receiving the flashcube and a mechanical actuating member for firing one of the flashlamps, such as the camera mechanism described in U.S. Pat. Nos. 3,602,618 or 3,646,864.

Referring to FIGS. 1 and 2, the percussive flashcube 10 comprises a substantially rectangular connecting base 12 upon which is mounted a plurality of percussively-ignitable flashlamps 14 and associated preenergized striker springs 16. More specifically, the cube unit contains four flashlamps, one along each side of the base 12, and four preenergized striker springs 16, each being releasable to fire its respective flashlamp. Each lamp is provided with a respective reflector 18, and the assemblage of lamps, striker springs and reflectors is enclosed in a transparent cover 20 secured to the base 12.

As shown particularly in FIG. 2, each lamp 14 comprises an hermetically sealed tubular glass envelope 22 having a primer depending therefrom and a filling of combustible foil 24, such as shredded zirconium, and a combustion supporting gas, such as oxygen, disposed therein. The primer comprises a metal tube 26 within which a wire anvil and a charge of fulminating material are disposed.

As shown in FIG. 2, the folded torsion spring 16 typically is formed from 0.021 inch music wire. The wire is shaped to define a hairpin torsional section having segments 28 and 30 and a bight 32. The end portion of segment 28 is shaped to define a stationary supporting foot 34, the tip of which is shaped to define a catch 36. Portions of foot 34 and catch 36 are hidden in FIG. 2. The end portion of segment 30 is shaped to define a striker 38 which, when the spring is cocked as shown, crosses the supporting foot 34 and is restrained by catch 36. The stationary supporting foot is seated in an elongated slot formed in the base 12 on or near a diagonal thereof, said slot being sufficiently shallow so that the catch 36 formed on the free end of the foot 34 will project a relatively substantial distance above the plane of the top face of the base 12.

Initially, the striker 36 may be formed at an angle of about 90° to the stationary supporting foot 34, although the angle through which the striker is rotated to position it behind the catch 36, as shown, may be of any value that does not cause overstressing of the wire. A center post 40 on the top face of the base 12 provides a suitable bearing surface for the heel of the striker during cocking, and it also aids in preventing accidental displacement of the spring 16 sufficient to free the striker from the catch some time after cocking and before firing is intended.

Displacement of the cocked striker 38, to release it from the catch 36 and thus permit it to strike the primer tube 26 and fire the lamp, is effected by a suitable actuating member 42 moving up through an aperture 44 provided therefor in the base. When the member 42 pushes the striker 38 upwardly a distance sufficient to clear the top of catch 36, the striker swings clockwise, as shown by the arrow, and hits and indents the impact sensitive primer tube 26 at high velocity to cause deflagration of the fulminating material located therein and thus ignite the combustible foil 24. Hence, each of the radially disposed strikers 38 in the flashcube overlies and is adjacent to a respective aperture 44 whereby it is accessible to be released by the actuating member 42 as each side of the flashcube is successively indexed to the firing position. As shown in FIG. 1, the apertures 44 in the connecting base comprise a circular pattern of symmetrically located slots each having a circumferentially arcuate shape.

As further illustrated in FIG. 1, the bottom or lower face of the connecting base 12 is provided with a centrally disposed mounting post 46 depending therefrom for indexably mounting the flashcube on a camera and providing means whereby the flashcube may be rotated 90° after the lamp has been flashed so that another lamp may be advanced to the firing position. For example, the mounting post 46 and the associated camera mechanism may be similar to that described in U.S. Pat. Nos. 3,602,618 or 3,646,864. The connecting base is also provided with four locating holes 48 which pass through the base near the four corners thereof whereby the base may be held on guide pins during the manufacturing process.

Figure 3:
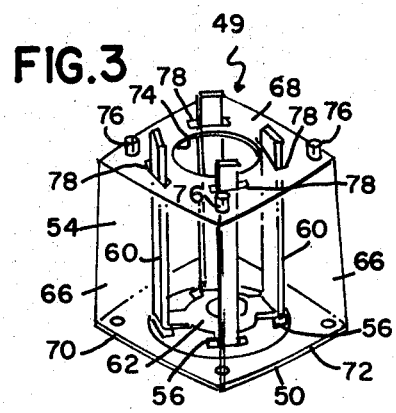
FIG. 3 is a perspective view of a flash extender according to the invention.

Referring now to FIGS. 3 and 4, a flash extender 49 according to the invention comprises an assembly of three basic components 50, 52 and 54 each of which may comprise a unitary molded piece of plastic material, such as polystyrene or polycarbonate. Component 50 comprises a retaining base which may be identical to the connecting base 12 of the flashcube. In particular, the base includes a circular pattern of four symmetrically located apertures 56 each having the shape of a circumferentially arcuate slot and corresponding to the apertures 44 in the flashcube base. A center post 58 projects upwardly from the substantially planar top face of the base 50, and a centrally disposed mounting post (not shown in FIGS. 3 and 4), which is identical to mounting post 46 of the flashcube, depends from the bottom face of base 50, whereby the extender base is insertable into a camera socket of the type referenced above as suitable for receiving the percussive flashcube of FIG. 1.

The component 52 comprises a symmetrical array of four vertical rods 60 interconnected at one end by a flexible web 62 centrally attached to the top face of base 50. For example, the web may have a central opening 64 through which the center post 58 is inserted and then heat staked unto the web to secure the position of component 52 onto base 50. Web 62 is disposed substantially parallel to the top surface plane of base 50 and supports the rods substantially normal thereto, whereby the rods extend upwardly away from the top surface of the base. Prior to staking center post 58 unto the web, component 52 is rotationally positioned on base 50 so that each of the four vertical rods is located directly over a respective one of the four slots 56. In this manner, there is provided an aperture 56 adjacent each rod 60 through which the respective rod is accessible to be actuated by the actuating member 42 of a camera upon which the flash extender is mounted. When centrally attached to base 50, web 62 is sufficiently resilient to return an actuated rod to its rest position (FIGS. 3 and 5) subsequent to retraction of the actuating member.

Component 54 comprises a cover for supporting a flashcube mounting means at a predetermined distance away from the retaining base 50; cover 54 may be similar to the flashcube cover 20, except for the top wall which is modified to provide the mounting means for receiving and detachably retaining the connecting base of an inserted flashcube. More particularly, the molded piece of plastic comprising cover 54 includes four-side walls 66 of rectangular shape and a top wall 68 having a substantially square shape and disposed parallel to the top surface plane of retaining base 50. The common bottom edge 70 of the cover 54 is permanently affixed to the retaining base 50 at the outer edges of sealing rims 72 which are formed in the base. For example the cover may be affixed to the base by adhesive, heat sealing, or sonic sealing. Top wall 68 defines a central access opening 74 for receiving the mounting post 46 of an inserted flashcube, and has four lock pins 76, one projecting from each of the four corners of top wall 68, for engaging the locating holes 48 of an inserted flashcube to thereby detachably retain the flashcube. For example, each of the elements 76 may comprise a split-pin, as illustrated in FIG. 4A, and be an integral part of the single molded plastic piece comprising component 54. Surrounding the central access opening 74 in top wall 68 is a circular pattern of symmetrically located apertures 78 each shaped as a circumferentially arcuate slot and corresponding to the striker access apertures 44 in the flashcube base and the access apertures 56 in the retaining base 50. Rods 60 extend from the retaining base 50 toward the top wall 68 and each rod is aligned with a respective one of the apertures 78 therein. Further, each rod 60 is shaped and located so that it will move through its respective aperture 78 upon actuation. To reduce vertical travel to a minimum, in the preferred embodiment shown, each of the rods 60 in the rest position extends through its respective aligned aperture 78 in the top wall mounting means by an amount sufficient to lightly contact a preenergized striker in an inserted flash unit.

When the flash extender is assembled, therefore, cover 54 is affixed to the base 50 and substantially encloses the rods 60, and the top wall 68, which comprises the flashcube mounting means, is supported on and spaced a predetermined distance from the retaining base 50 by the side walls 66. In the preferred case, wherein component 54 is similar to flashcube cover 20, this predetermined distance will be approximately the height of one flashcube, excluding mounting post 46.

Referring now to FIG. 5, a flash extender 49 according to the invention is shown mounted on a camera 80 having a centrally disposed lens 82 and a view finder 84. The extender 49 is mounted on the camera in the same manner as a percussive flashcube by inserting its centrally depending mounting post (not shown, but identical to post 46 in FIG. 1) into the rotatable socket (not shown) on the top side of the camera. A percussive flashcube 10 is then mounted on top of the extender 49, with mounting post 46 entering the central access opening 74 in the top wall of the extender while the four lock pins 76 resiliently engage the locating holes 48 in the connecting base 12 to secure the percussive flashcube in position. At the same time, the four vertical rods 60 enter the four access slots 44 of the flashcube base and lightly contact the preenergized strikers 38 in the flashcube. The vertical rods 60, being interconnected at one end by a thin, flexible plastic web, are almost frictionally free to move in a vertical direction when a force is applied as shown by the arrow on the camera actuating member 42. This force represents the required energy supplied by the camera mechanism to conventionally release a percussive flashcube striker spring by means of the actuating member 42 entering the flashcube slot 44 and contacting a striker spring 38.

To illustrate overall operation, use of the flash extender will now be described with respect to a camera of the type described in U.S. Pat. No. 3,602,618. The photographer loads the camera 80 with a film cartridge and, by operating the film advance lever (now shown) advances the film to the first frame for exposure. The flash extender 49 is then mounted on top of the camera, and a percussive flashcube 10 is mounted on top of the extender. The camera mechanism of U.S. Pat. No. 3,602,618 is designed so that insertion of a mounting post such as that designated as element 46 in FIG. 1, into its complementary receiving socket in the camera causes upward movement of the actuating member 42 to an intermediate position for sensing purposes. In the present application, this sensing movement causes an upward pressure against, or a slight actuation of, one of the vertical rods 60 until contact between the rod and the preenergized striker 38 (at the firing position) restricts further movement. The camera is now ready for taking a picture. On the other hand if a released striker (used lamp) is in the firing position, the upward movement of member 42 and the rod 60 in contact therewith is not restricted, whereupon a member is actuated to signal the presence of a used lamp.

When the shutter is actuated to effect an exposure, the camera mechanism synchronously actuates a further movement of member 42 to its maximum upward position. In traveling to this position, member 42 actuates an upward movement of the associated rod 60 sufficiently to cause release of the overlying striker 38 to fire its associated lamp at the firing position.

To prepare for the next picture, the photographer needs only to operate the film advancing lever (not shown) in the usual manner. This not only advances the film cartridge to the next frame but it also rotates the flash extender 49 and the flashcube 10 detachably retained thereon to carry a fresh lamp into firing position. More specifically, operation of the film advance mechanism causes the camera socket and the attached extender and flashcube to be rotated by a quarter of a turn, whereupon associated cam surfaces in the camera mechanism cause member 42 to be retracted. As a result, the actuating rod 60 returns to its normal rest position due to the spring-like action of the thin, plastic web 62.

In the camera mechanism of U.S. Pat. No. 3,646,864, the basic operational steps of the actuating member, namely, sensing, striker release and retraction, are carried out, but the timing of the steps is arranged so that the actuating member 42 remains in a withdrawn or retracted position except during the actuating cycle of the shutter release mechanism. More specifically, actuating member 42 has a retracted position prior to actuation of the shutter release and is moved, upon actuation thereof, first to the sensing position in engagement with the flashlamp striker via rod 60, and then to a second striker release position for firing the flashlamp. If the forwardly facing flash lamp is inoperative because the striker is not energized, the actuating member, upon depression of the shutter release will move directly to its second position to effect a signal indicative of the inoperative flash lamp condition. Upon return of the shutter release to its initial position, loading springs automatically retract the actuating member 42 to its rest position.

Using a flash extender in this manner provides a relatively simple and economical means for igniting a percussive flashunit at a predetermined offset distance from the camera lens 82 for eliminating or reducing the effect of "red-eye." The described preferred embodiment, comprising an assembly of three molded plastic components with a cover 54 similar to the flashcube cover 20, provides a most economical design and a minimum height that will evidence improvement in reducing the "red-eye" effect. A longer similar device, such as by increasing the height of the walls 66 and rods 60, or by stacking one extender or another, will provide a further reduction in the "red-eye" effect.

It may also be advantageous to make the extender an integral part of each and every percussive flashcube unit, as illustrated in FIG. 6. The multilamp flash unit 90 of FIG. 6 is a rectangular shaped package having four percussively ignitable flash lamps 14 and reflectors 18 and associated preenergized striker (not shown) mounted on a supporting base 92. The supporting base has apertures adjacent each striker (not shown) similar to apertures 44 of the connecting base 12. A retaining base 50 is attached to and spaced a predetermined distance away from the supporting base 92 by means of side walls 94, as shown. The retaining base 50 is identical to the flashcube connecting base 12 and has a depending mounting post 96 identical to post 46 of FIG. 1, whereby the unit is insertable into the socket of a camera having a mechanical actuating member for firing percussive flashlamps. Four rods 60 extend from the base 50 toward supporting base 92 and are interconnected at one end by a flexible web 62 centrally attached to base 50 by the heat staked center post 98. As shown in FIG. 4, base 50 has an aperture 56 adjacent each rod 60 through which that rod is accessible to be actuated by the camera actuating member, and each rod 60 is aligned with one of the striker access apertures in the supporting base and adapted to move therethrough upon actuation for releasing a striker. The supporting base 92 may comprise a single molded piece affixed to plastic sidewalls 94 extending the entire length of the unit. Alternatively, flash unit 90 may be constructed by attaching flashcube 10 to extender 49 and heat staking the locking pins 76 as denoted by elements 100 in FIG. 6; in this instance, supporting base 92 comprises the juxtaposed connecting base 12 and top wall 68.

Accordingly, although the invention has been described with respect to specific embodiments, it will be appreciated that modifications and changes may be made by those skilled in the art without departing from the true spirit and scope of the invention.

What I claim is:

1. For use with a multilamp flash unit, including a plurality of precussively-ignitable flashlamps and associated preenergized strikers mounted on a connecting base, together with a camera having socket means for receiving said flash unit and a mechanical actuating member for firing one of said flashlamps, each of said strikers being individually releasable to fire a respective one of said flashlamps, and said connecting base having an aperture adjacent each striker through which the respective striker is accessible to be released by said actuating member to fire its respective flashlamp; the improvement of a flash extender comprising, in combination, a retaining base insertable into said camera socket means; a mounting means supported on and spaced a predetermined distance away from the retaining base of said extender for receiving and detachably retaining the connecting base of an inserted flash unit, said mounting means having an aperture corresponding to each striker access aperture in the connecting base of an inserted flash unit; and a plurality of rods extending from said retaining base toward said mounting means and interconnected at one end by a flexible web attached to said retaining base, the retaining base of said extender having an aperture adjacent each rod through which the respective rod is accessible to be actuated by said actuating member, and each of said rods being aligned with one of the apertures in said mounting means and adapted to move therethrough upon actuation for releasing a striker.

2. The flash extender of claim 1 wherein said retaining base has a substantially planar surface, said flexible web is disposed substantially parallel with said planar surface and supports said rods substantially normal thereto, and said web is sufficiently resilient to return an actuated rod to its rest position subsequent to retraction of said actuating member.

3. The flash extender of claim 2 wherein said rods are symmetrically arrayed about said retaining base, and said web is centrally attached to said retaining base.

4. The flash extender of claim 3 wherein the apertures in said retaining base and mounting means comprise corresponding circular patterns of symmetrically located slots respectively aligned with said symmetrical array of rods.

5. The flash extender of claim 1 wherein each of said rods in the rest position extends through its respective aligned aperture in said mounting means by an amount sufficient to lightly contact a preenergized striker in an inserted flash unit.

6. The flash extender of claim 1 wherein the connecting base of said flash unit has a centrally disposed mounting post depending therefrom and a plurality of locating holes therethrough, and said extending mounting means defines a central access opening for receiving the mounting post of an inserted flash unit and inlcudes a plurality of lock pins for engaging said locking holes of an inserted flash unit to thereby detachably retain said unit.

7. The flash extender of claim 1 wherein the retaining base of said extender is identical to the connecting base of said flash unit.

8. The flash extender of claim 7 wherein the connecting base of said flash unit has a centrally disposed mounting post depending therefrom and a plurality of locating holes therethrough, and said extender mounting means comprises a cover affixed to said retaining base and substantially enclosing said rods, said cover having a top wall and a plurality of side walls, said apertures in the mounting means being contained in said top wall, said top wall defining a central access opening for receiving the mounting post of an inserted flash unit and having a plurality of lock pins projecting therefrom for engaging said locating holes of an inserted flash unit to thereby detachably retain said unit, and said top wall being spaced said predetermined distance away from said retaining base by the sidewalls of said cover.

9. The flash extender of claim 8 wherein said lock pins are split pins.

10. The flash extender of claim 8 wherein aid retaining base has a substantially planar surface, said flexible web is disposed substantially parallel with said planar surface and supports said rods substantially normal thereto, said rods are symmetrically arranged about said retaining base, said web is centrally attached to said retaining base, the top wall of said cover is substantially parallel with the planar surface of said retaining base, and the apertures in said retaining base and the top wall of said cover comprise corresponding circular patterns of symmetrically locates slots respectively aligned with said symmetrical array of rods.

11. The flash extender of claim 10 wherein each of said rods in the rest position extends through its respective aligned slot in the top wall of said cover by an amount sufficient to lightly contact a preenergized striker in an inserted flash unit.

12. The flash extender of claim 10 wherein each of the three components consisting of said retaining base, cover, and web-connected rods is a unitary molded piece of plastic material.

13. A multilamp flash unit comprising, in combination, a supporting base, a plurality of precussively ignitable flashlamps and associated preenergized strikers mounted on said supporting base, each of said strikers being individually releasable to fire one of said flashlamps, said supporting base having an aperture adjacent each striker through which the respective striker is accessible to be released, a reatining base attached to and spaced a predetermined distance away from said supporting base on the side opposite that on which the lamps and strikers are mounted, said retaining base being insertable into socket means on a camera having a mechanical actuating member for firing one of said flashlamps, and a plurality of rods extending from said retaining base toward said supporting base and interconnected at one end by a flexible web attached to said retaining base, said retaining base having an aperture adjacent each rod through which the respective rod is accessible to be actuated by said camera actuating member, and each of said rods being aligned with one of the apertures in said supporting base and adapted to move therethrough upon actuation for releasing a striker.

* * * * *